UNITED STATES PATENT OFFICE.

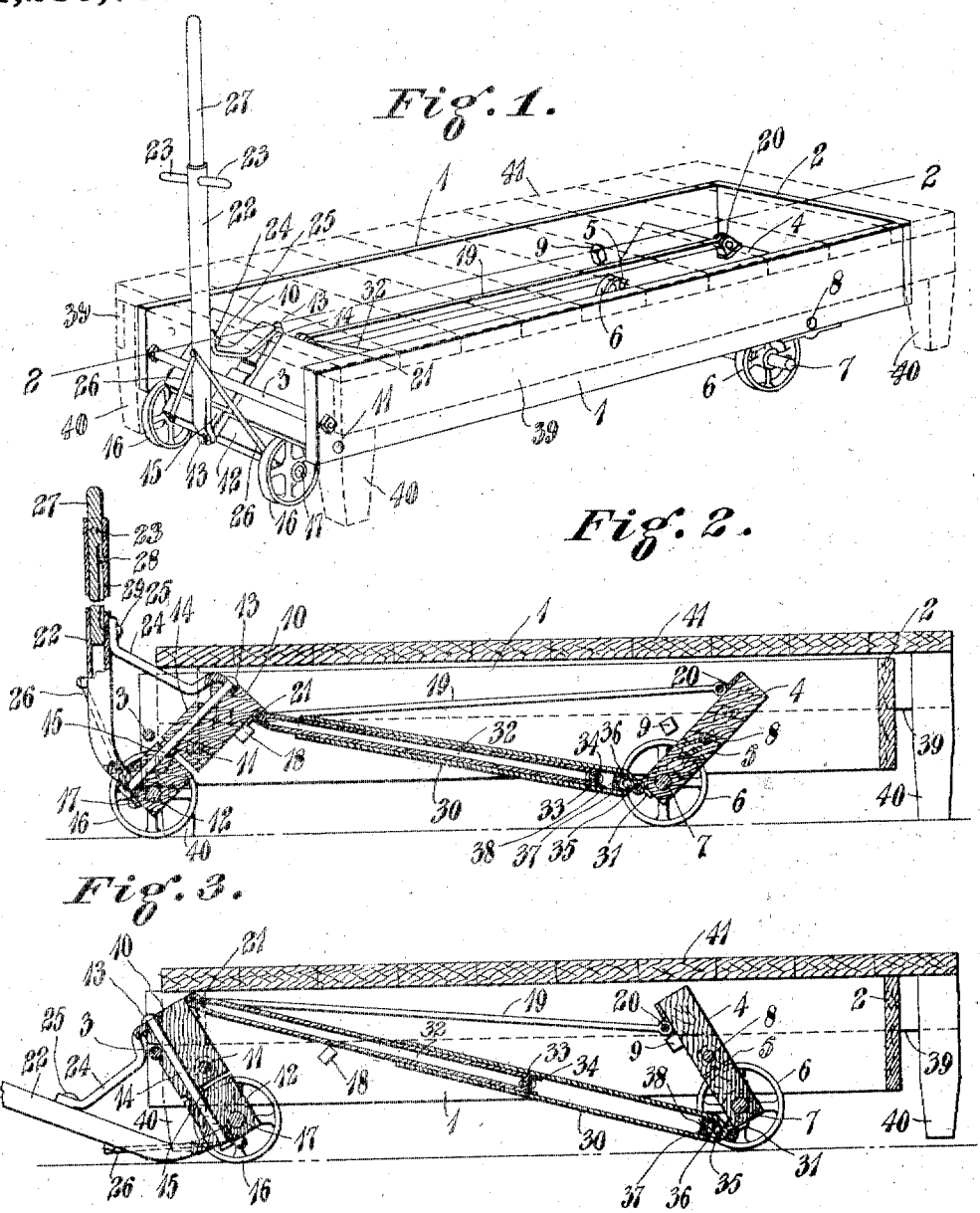

JOHN B. MARTIN, OF CINCINNATI, OHIO.

LIFTING-TRUCK.

1,280,795.  Specification of Letters Patent.  Patented Oct. 8, 1918.

Application filed September 14, 1917. Serial No. 191,372.

*To all whom it may concern:*

Be it known that I, JOHN B. MARTIN, a citizen of the United States, and a resident of Cincinnati, in the county of Hamilton and State of Ohio, have invented certain new and useful Improvements in Lifting-Trucks, of which the following is a specification.

My invention relates to elevating trucks, and its object is to simplify the construction of trucks of this kind and make them more convenient in use.

My invention consists in the combination of parts and in the details of construction and arrangement of parts as will hereinafter be more fully described and claimed.

In the drawing:

Figure 1 is a general perspective view of a platform with my improved truck thereunder, the platform being shown by dotted lines only, so as not to obscure the truck details, the truck and platform being in their lowered positions;

Fig. 2 is a longitudinal vertical section on a plane corresponding to the line 2—2 of Fig. 1; and Fig. 3 is a similar section, but showing a truck and platform in their elevated positions.

As I prefer to construct my invention, there is a truck-frame comprising side members 1 and a rear member 2 attached to the ends of the side members; the front ends of the side members 1 being rigidly connected by a bar 3. As here shown, the members 1 and 2 of the truck-frame are boards placed with their edges up and down; but it will be understood that a modified frame of any other suitable material or suitable arrangement of parts will be equivalent.

Some distance forward from the rear member 2 extending across between the members 1 is the rear bolster 4 which, as here shown, is a beam of oblong cross-section with its edges in general upward and downward directions and having rectangular recesses 5 formed by cutting away its lower corners. These recesses receive the truck wheels 6 journaled on an axle 7 that extends through the lower part of the bolster 4 from one recess 5 to the other. Also the end parts of the axle 7 preferably extend past the outer sides of the hubs of the wheels 6 far enough to engage with the lower edges of the truck-frame members 1.

A short distance above the tops of the recesses 5, a shaft 8 extends through the bolster 4 from end to end and through the side members 1 of the truck-frame, thus pivoting the bolster 4 in said frame. This pivot thus formed by the shaft 8 is above the lower edges of the frame members 1 considerably less distance than it is above the axle 7 in the bolster. Therefore, the lower part of the bolster may swing forward through a suitable angle before the projecting parts of the axle 7 engage with the lower edges of the members 1. The backward swinging of the axle 7 is limited to a considerably less angle by stops 9 projecting from the inner sides of the frame members 1 above and forward of the shaft 8 for the front sides of the end parts of the bolster 4 to engage with.

A short distance back from the front ends of the members 1, the front bolster 10 extends across between the members with a shaft 11 extending through it from end to end in its lower part and through the frame members; thus pivoting this bolster 10 in a manner similar to the pivoting of the rear bolster 4. This front bolster 10 does not extend so far below the shaft 11 as does the bolster 4 below the shaft 8, and below it is a swiveled bolster 12 which is swiveled to the bolster 10 by a pin 13 extending down through a forward projection 14 on the bolster 10 and a similar projection 15 on the bolster 12; so that the bolster 12 may swing in a plane at right angles to the plane of swinging of the bolster 10 with which also swings the bolster 12. Thus this bolster 12 has swinging movements in planes at right angles to each other. The swiveled bolster 12 is made short enough to allow ample room for the front wheels 16 between its ends and the inner sides of the truck-frame members 1, and an axle 17 extends through the lower part of this bolster 12 from one end to the other and projects past the ends to receive the wheels 16. The front connecting bar 3 of the truck frame is placed high enough to admit the wheels 16 under it but low enough to form a suitable forward stop for the bolster 10 in a manner similar to the stopping of the rear bolster 4 by the stops 9. Also there are rear stops 18 for the front bolster 10 projecting from the inner sides of the frame members 1. The upper parts of the bolsters 4 and 10 are connected by a fore-and-aft connecting bar 19 pivoted to brackets 20 and 21 on the front side of the rear bolster 4 and the rear side of the front bolster 10, respectively.

It will be understood that this bar 19 is so proportioned and has such relative position on the bolsters, and the various stops 9, 3 and 18 are so relatively positioned, that when the bolsters are swung backward the support of the truck-frame and connected parts will be divided between the projecting parts of the rear axle 7 and the front stops 18; and that when the bolsters are swung forward the support will be divided between the rear stop 9 and the front bar 3.

The lifting and pulling device comprises the hollow tongue 22 with its lower end part flattened and bent and pivoted on the lower end part of the pin 13; the bend being such that when the bolsters are swung backward, the tongue 22 will stand substantially vertical and when the bolsters are swung forward, the tongue will extend forwardly and upwardly at about the right angle for a convenient grasping of the handles 23 near the upper end of the tongue. A stay 24 has its rear end part pivoted on the upper end part of the pin 13 from which rear end said stay is bent downwardly and then forwardly and upwardly and fixed to the rear side of the tongue 22 as by the rivet 25. Lateral braces 26 are fixed to the lower side of the tongue 22 and extend divergingly backward under the lower side of the swivel bolster 12 to which they are fixed.

Thus, the tongue 22 is connected to both bolsters 10 and 12 in such a manner as to very effectively pull on both of them in swinging them on their shaft 11, and, through the connection of the bar 19 swinging the rear bolster 4 on its axle 7; but also to swing the swivel bolster 10 on its pin 13 in the other plane.

Sliding inside the hollow tongue 22 is the lifting bar 27 prevented from complete withdrawal by a stud 28 projecting from the inner wall of the tongue 22 into a longitudinal slot 29 in the side of the bar 27. This bar 27 normally projects a short distance only from the upper end of the tongue 22, as shown in Fig. 2; but when a heavy load is to be elevated by the truck, this bar 27 may be pulled out to increase the leverage, as shown in Fig. 1.

Connected to the upper part of the front bolster 10 and the lower part of the rear bolster 4 is a suitable cushioning device, which, as here shown, comprises an elongated tubular casing 30 with its lower end pivoted to a bracket 31 on the lower front corner of the rear bolster 4, and an elongated tubular plunger 32 with its front end pivoted to the bracket 21 on the upper rear side of the front bolster 10. This plunger 32 has its rear end 33 closed and provided with a suitable cup 34 fitting the interior of the casing 30 snugly. The rear end of the casing 30 is provided with air inlet openings 35 immediately forward of which is an annular flange 36 on which seats a disk 37 which has a small central opening 38. The casing 30 and the plunger 32 are of such length that the plunger still has considerable bearing in the casing when the bolsters are swung forward as in Fig. 3, and yet has sufficient clearness in the rear part of the casing when the bolsters are swung backward as in Fig. 2.

Both the connecting bar 19 and the cushioning device are preferably extended substantially along the center line of the truck from front to rear, as indicated in Fig. 1.

The platform for use with the truck may be of any suitable construction which will permit the truck to run under it when in the lowered position illustrated in Figs. 1 and 2. Thus for instance, as shown in Fig. 1, there are side sills 39 fixed to legs 40, and a suitable flooring 41 is made up of pieces extending across from one sill 39 to the other and fixed to the upper edges thereof and to the upper ends of the legs 40, whereby the platform is suitably transversely braced at its ends without obstructing the spaces between the legs 40 and under the flooring 41, so that the truck may run freely thereunder, as illustrated. When the bolsters are swung back, as shown in Figs. 1 and 2, the truck is run under the platform or other object to be lifted thereby, the tongue 22 and its bar 27 being then in upright position, as shown. Then a forward and downward pull on the tongue 22 (by means of the extended bar 27 if necessary for ease in overcoming the load) swings the bolsters forward to the positions shown in Fig. 3, lifting the truck-frame a short distance and lifting with it the platform, so that the legs 40 are a short distance from the floor. Then the tongue 22 has been depressed to a suitable position for readily drawing the truck over the floor and guiding it in any desired direction by virtue of the swiveling of the bolster 12 carrying the front wheels 16.

When the load is to be lowered, it is necessary only to raise the tongue 22 (by means of the extended bar 27, if necessary to overcome the load) and permit the bolsters to swing backward again.

It will be understood that either in elevating or lowering, the initial part of the operation only is resisted by the load; and after the bolsters have passed vertical positions, the rest of the swinging is under the action due to the weight of the load being raised or lowered. The last part of the raising operation is shorter than that of the lowering operation; the bolsters do not swing forward through as great angles as they swing backward past the vertical line, and the slight depression of the load during this short latter part of the raising operation may be very readily controlled by the operator holding to the tongue 22 or extended bar 27; especially since the force of the tongue or bar is downward and can be very effectively resisted by the operator with comparatively small effort. However, in the longer latter part of the lowering operation and the considerably greater angles through which the bolsters swing then, and on account of the tongue 22 and bar 27 being close to the vertical position during this time so that the control of the operator is not very effective, I prefer to provide the cushioning device constructed as hereinbefore described.

When the bolsters are swung forward and the plunger 32 is pulled forward in the casing 30, the air rushes in through the opening 35 pushing the disk 37 forward from its seat 36 with very little obstruction; but when the bolsters swing backward and the plunger 32 is pushed backward in the casing 30, the disk 37 seats, and the air entrapped between it and the cup 34 on the plunger can escape only through the very small opening 38, so that the fall of the load and the supporting parts is amply cushioned by the air thus compressed during this obstructed discharge.

From the foregoing, it will be seen that I have provided a lifting truck of very simple construction which is held in elevated position without the use of any complicated latching mechanism, and which is either elevated or lowered with comparative ease. It will be understood that the truck may be used in conjunction with the platform shown, or any other suitable platform, on which any kind of goods may be placed for storage, and yet ready to be moved on the truck; or the truck may be used for elevating and hauling any other object under which it may be run, and which it will lift slightly upon elevation. It will also be understood that my invention is capable of minor variations in its construction without departing from the scope and spirit of the following claims:

1. In a lifting truck, a frame element, a supporting wheel, a swinging element pivotally connected to said wheel and to said frame to swing the frame down relatively to the wheel when swung past the vertical line in one direction, a stop for said element to limit the swinging in said direction, and said element being adapted to swing said frame downward relatively to said wheel when swung in the other direction past the vertical line, and a stop for said element limiting its swinging in said other direction to an angle less than that of its swinging in the first-mentioned direction, whereby said frame element is elevated above its position which it had when swung down in said first-mentioned direction, whereby said element is held in said elevated position under the action of gravity, and a swivel connection between said wheel and said swinging element entirely below the top of said frame element, whereby said wheel may be swung in a plane at an angle to that of the swinging of said element, to guide said truck, without engagement of said swivel connection with a load on said top of said frame element.

2. In a lifting truck, a frame element, a rear wheel, a front wheel, a rear swinging element, a front swinging element, said swinging elements connecting said rear wheel and said front wheel, respectively, to said frame element, a connecting element connected to said swinging elements causing them to swing in unison, a rear stop for said elements and a front stop for said elements, said stops being so positioned that the swinging of said elements in one direction is through a considerably greater angle than their swinging in the other direction, whereby said frame element is raised and then lowered less than it was raised, and held by the action of gravity in an elevated position relative to its first position, and a cushioning device connected to oppositely moving parts of said swinging elements.

JOHN B. MARTIN.

Witnesses:
JAMES N. RAMSEY,
CLARENCE PERDEW.